(12) United States Patent
Yamoto et al.

(10) Patent No.: US 6,664,345 B2
(45) Date of Patent: Dec. 16, 2003

(54) OXAZOLIDONE RING-CONTAINING EPOXY RESIN

(75) Inventors: Shuhei Yamoto, Hirakata (JP); Eiji Nakajima, Yokohama (JP); Mitsuo Yamada, Suita (JP)

(73) Assignee: Nippon Paint Co., Ltd., Osaka-Fu (JP)

(*) Notice: Subject to any disclaimer, the term of this patent is extended or adjusted under 35 U.S.C. 154(b) by 140 days.

(21) Appl. No.: 09/930,448

(22) Filed: Aug. 16, 2001

(65) Prior Publication Data

US 2002/0037975 A1 Mar. 28, 2002

Related U.S. Application Data

(62) Division of application No. 09/427,546, filed on Oct. 27, 1999, now abandoned.

(30) Foreign Application Priority Data

Oct. 27, 1998 (JP) ............................................. 10-305294

(51) Int. Cl.[7] ............................ C08K 3/20; C08L 63/00; C08L 63/02
(52) U.S. Cl. .................... 525/528; 523/415; 525/454
(58) Field of Search ................ 525/454, 528; 523/415

(56) References Cited

U.S. PATENT DOCUMENTS

| | | | |
|---|---|---|---|
| 4,442,281 A | 4/1984 | Hentschel et al. | 528/79 |
| 4,658,007 A | 4/1987 | Marks et al. | 528/55 |
| 5,447,973 A | 9/1995 | Yamada et al. | 525/528 |
| 5,686,541 A | 11/1997 | Wang et al. | 528/73 |

FOREIGN PATENT DOCUMENTS

JP 3-43473 2/1991

*Primary Examiner*—Robert E. L. Sellers
(74) *Attorney, Agent, or Firm*—Wenderoth, Lind & Ponack, L.L.P.

(57) ABSTRACT

The present invention provides a novel oxazolidone ring-containing epoxy resin suitable for use as a resin for a coated film having a structure of the formula:

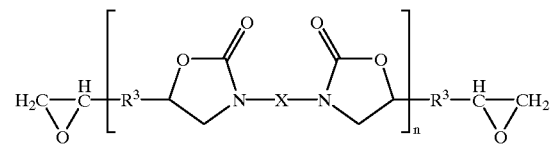

wherein $R^3$ represents a residue excluding epoxy groups of diepoxide, X represents a residue excluding isocyanate groups of polyurethane diisocyanate, and n represents an integer of 1 to 5; and wherein X has a structure of the formula:

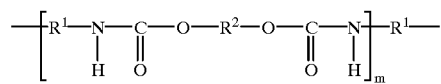

wherein $R^1$ represents a residue excluding isocyanate groups of diisocyanate, $R^2$ represents a residue excluding hydroxyl groups of diol, and m represents an integer of 2 to 10.

9 Claims, No Drawings

OXAZOLIDONE RING-CONTAINING EPOXY RESIN

This application is a divisional of Ser. No. 09/427,546 filed Oct. 27, 1999, abandoned.

FIELD OF THE INVENTION

The present invention relates to a novel oxazolidone ring-containing epoxy resin, more specifically, relates to an oxazolidone ring-containing epoxy resin which is preferred to be used as a resin for an aqueous coating composition.

BACKGROUND OF THE INVENTION

An epoxy resin is the resin which has more than two epoxy groups (—CH(O)CH$_2$) in the molecule. An epoxy resin affords a cured resin excellent in dielectric ability, mechanical strength, dimensional stability, and chemical resistance when it is cured by combining a suitable curing agent. An epoxy resin therefore has variety of applications such as a paint for metal, an anticorrosion material, an adhesive, a structural material reinforced by glass fibers, and the like.

J. Polymer Sci. Part A-1, 4, 751 (1966), Iwakura et al, describes an oxazolidone ring-containing epoxy resin. The oxazolidone ring-containing epoxy resin is that obtained by allowing a blocked diisocyanate compound which is obtained by reaction of diisocyanate and monoalcohol, to react with a diepoxy compound. J. Appl. Polymer Sci., 9, 1984 (1966), Sander et al, for example describes an oxazolidone ring-containing epoxy resin which is obtained by allowing a diisocyanate compound to directly react with a diepoxy compound.

The epoxy resins may be employed as a binder resin for an aqueous coating composition. In this instance, an ionic group is introduced in the epoxy resins to provide hydrophilic epoxy resins. Japanese Patent Laid Open Publication No. 306327/1993 describes the method of that a terminal epoxy group of the oxazolidone ring-containing epoxy resin prepared by the above described means, is ring-opened with an active hydrogen compound having an ionic group to prepare an oxazolidone ring-containing aqueous resin having an ionic group such as an amino group, and a carboxyl group therein. This publication also describes an aqueous coating composition which comprises such an oxazolidone ring-containing epoxy resin.

Corrosion resistance, impact resistance, cohesiveness, excellent appearance, and the like are generally required for a resin for use in a coated film. An oxazolidone ring-containing epoxy resin is excellent in heat resistance, and corrosion resistance, and therefore affords a coated film excellent in heat resistance, and corrosion resistance. However, the conventional oxazolidone ring-containing epoxy resin is poor in flexibility. Therefore, impact resistance of a coated film becomes poor when the oxazolidone ring-containing epoxy resin is used as a resin for a coated film.

SUMMARY OF THE INVENTION

The present invention provides a novel oxazolidone ring-containing epoxy resin suitable for use as a resin for a coated film. The oxazolidone ring-containing epoxy resin of the present invention affords a coated film excellent in impact resistance in addition to heat resistance, and corrosion resistance.

The oxazolidone ring-containing epoxy resin has a structure of the formula:

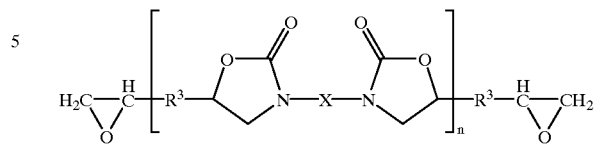

wherein R$^3$ represents a residue excluding epoxy groups of diepoxide, X represents a residue excluding isocyanate groups of polyurethane diisocyanate, and n represents an integer of 1 to 5; and wherein X has a structure of the formula:

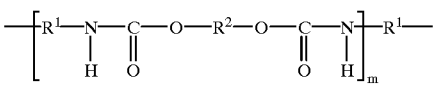

wherein R$^1$ represents a residue excluding isocyanate groups of diisocyanate, R$^2$ represents a residue excluding hydroxyl groups of diol, and m represents an integer of 2 to 10.

DETAILED DESCRIPTION OF THE INVENTION

The oxazolidone ring-containing epoxy resin of the present invention is preferably prepared by the process comprising the steps of:
  obtaining a blocked polyurethane diisocyanate represented by the formula:

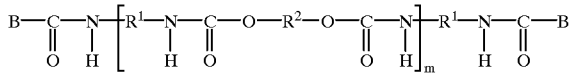

wherein R$^1$ represents a residue excluding isocyanate groups of diisocyanate, R$^2$ represents a residue excluding hydroxyl groups of diol, B represents a residue of a blocking agent, and m represents an integer of 2 to 10, by reacting diisocyanate, diol, and a blocking agent; and
  allowing the blocked polyurethane diisocyanate to react with diepoxide.

Diisocyanate means a compound which has two isocyanate groups in the molecule. Specific examples of the diisocyanate include aromatic diisocyanate such as 4,4'-diphenylmethane diisocyanate (MDI), tolylene diisocyanate (TDI), and xylylene diisocyanate (XDI); aliphatic diisocyanate (comprising alicyclic diisocyanate) such as hexamethylene diisocyanate (HMDI), isophorone diisocyanate (IPDI), 4,4'-methylenebis(cyclohexylisocyanate), trimethyl hexamethylene diisocyanate.

Preferred diisocyanate is the aromatic diisocyanate. The aromatic diisocyanate is highly reactive with an epoxy group present in an epoxy resin, and an oxazolidone ring may easily be formed.

Diol means a compound which has two hydroxyl groups in the molecule. For example, oligomeric diol or polymeric diol preferably having a molecular weight of from 300 to 9000 is comprised in the diol of the present invention. Throughout the specification and claims, the wording "molecular weight" means number average molecular weight.

Specific examples of the diol include alkylene diol, aromatic diol, polyether diol, polyester diol, polycaprolactone diol, and polycarbonate diol, each having a molecular weight of up to about 9000. More specifically, examples of diol include alkylene diol such as ethylene glycol, 1,2-propylene glycol, 1,3-propane diol, 1,4-butane diol, 1,6-hexane diol; alicyclic diol such as 1,2-cyclohexane diol, 1,4-cyclohexane diol; aromatic diol such as bisphenol A, bisphenol F, resorcinol, hydroquinone; polyester diol prepared by an esterification reaction between polycarboxylic acid or the anhydride thereof, and polyol, polycaprolactone diol prepared by an polymerization reaction of caprolactone by using polyol as an initiator; and polyether diol such as polyoxyethylene glycol, polyoxypropylene glycol, polyoxytetramethylene glycol, the random or block copolymer thereof.

The diol is preferably primary diol of which hydroxyl groups are both primary. The reason is that primary diol is conveniently prepared by a simple procedure as described hereinafter. Preferred example of the primary diol is an ethylene oxide adduct of bisphenol A having a structure of the formula:

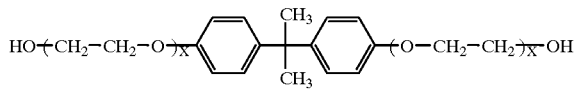

wherein x represents an integer of 1 to 10. The x in the formula is preferably an integer of 2 to 6 because both flexibility and corrosion resistance of the resulting coated film are easily achieved.

Polyurethane diol is the diol which is prepared by condensing diisocyanate with diol. The polyurethane diol may also be comprised in diol of the present invention. Preferred example of the polyurethane diol is that having a structure of the formula:

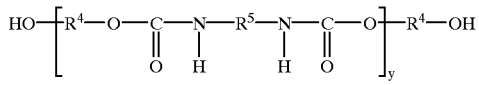

wherein $R^4$ represents a residue excluding hydroxyl groups of diol, $R^5$ represents a residue excluding isocyanate groups of polyisocyanate, and y represents an integer of 1 to 10.

The diol which corresponds to $R^4$ is not limited to, but the diol which corresponds to $R^4$ have to be different from polyurethane diol. Preferred examples of the diol include alkylene diol, aromatic diol, polyether diol, polyester diol, polycaprolactone diol, and polycarbonate diol. It is preferred that primary diol is employed as the diol which corresponds to $R^4$ because the resulting polyurethane diol also become primary diol. Particularly preferred example of the diol which corresponds to $R^4$, is the above described ethylene oxide adduct of bisphenol A.

The diisocyanate which corresponds to $R^5$ is preferably aliphatic diisocyanate. The reason is that weather resistance of the resulting epoxy resin becomes excellent for use as a coated film. Preferred examples of the diisocyanate which corresponds to $R^5$ include hexamethylene diisocyanate (HMDI), isophorone diisocyanate (IPDI), 4,4'-methylenebis (cyclohexylisocyanate), trimethylhexamethylene diisocyanate.

The polyurethane diol employed herein preferably has a molecular weight of from 300 to 9000, preferably 500 to 5000. If the molecular weight of the polyurethane diol is more than 9000, appearance of the coated film becomes poor, and if it is less than 300, flexibility of the coated film becomes poor.

A blocking agent is the low molecular weight compound which is temporarily allowed to react with an isocyanate group present in isocyanate, in order to prevent an unintended reaction of the isocyanate group at room temperature. The blocking agent is generally eliminated from the blocked isocyanate group when heated.

Any compound well known to the art as a blocking agent may be employed. Examples of the blocking agent include aliphatic alcohol such as methanol, ethanol, isopropanol, n-butanol, 2-ethyl hexanol, ethylene glycol monobutyl ether, cyclohexanol; phenols and their derivatives such as phenol, nitrophenol, ethyl phenol; oximes and their derivatives such as methyl ethyl ketoxime; lactams and their derivatives such as ε-caprolactam. Preferred example of the blocking agent includes methanol.

The reaction of diisocyanate, diol, and a blocking agent may be conducted in the manner well known to those skilled in the art. The three compounds, for example, are charged into a suitable container at a suitable amount ratio in the presence or absence of a suitable solvent, and are heated and stirred. Blocked polyurethane diisocyanate is obtained by this reaction.

The reaction amount ratio by mol of diisocyanate, diol, and blocking agent is generally 1.0 to 3.0/0.5 to 2.0/0.5 to 2.0. The repetition unit number "m" in the blocked polyurethane diisocyanate and the oxazolidone ring-containing epoxy resin of the present invention may appropriately be controlled by changing the reaction amount of diisocyanate, diol, and blocking agent.

When the ethylene oxide adduct of bisphenol A is employed as the diol which corresponds to $R^2$, m is preferred to be an integer of from 2 to 10, particularly 2 to 6. If m is more than 10, corrosion resistance of the coated film becomes poor, and if it is less than 2, flexibility of the coated film becomes poor.

When the polyurethane diol is employed as the diol which corresponds to $R^2$, m is preferred to be an integer of from 2 to 6, particularly 2 to 4. If m is more than 6, appearance of the coated film becomes poor, and if it is less than 2, flexibility of the coated film becomes poor.

The blocked polyurethane diisocyanate is then allowed to react with diepoxide. The oxazolidone ring-containing epoxy resin (a) of the present invention is prepared by this reaction (the step by step method).

The reaction of the blocked polyurethane diisocyanate with diepoxide may be conducted in the same manner as that described in J. Polymer Sci. Part A-1, 4, 751 (1966), Iwakura et al. Basically, the two components are charged into a suitable container at a suitable amount ratio in the presence or absence of a suitable solvent, and are heated and stirred.

As the diepoxide, for example, a polyphenol diglycidyl ether type epoxy resin which is a reaction product of a polycyclic polyphenol compound such as bisphenol A and bisphenol F, with epichlorohydrin; polyglycidyl ether of polyhydric alcohol such as ethylene glycol, 1,4-butane diol, and 1,6-hexane diol; polyglycidyl ester of aliphatic, alicyclic, or aromatic polycarboxylic acid; are employed. Particularly preferred examples of the diepoxide include bisphenol A diglycidyl ether.

The reaction amount ratio by mol of blocked polyurethane diisocyanate and diepoxide is generally 2 to 10 mol of diepoxide based on 1 mol of blocked polyurethane diisocyanate. The repetition unit number "n" in the oxazolidone ring-containing epoxy resin of the present invention may appropriately be controlled by changing the reaction amount of blocked polyurethane diisocyanate, and diepoxide.

When the ethylene oxide adduct of bisphenol A is employed as the diol which corresponds to $R^2$, n is preferred to be an integer of from 1 to 5, particularly 1 to 4. If n is more than 5, corrosion resistance of the coated film becomes poor, and if it is less than 1, flexibility of the coated film becomes poor.

When the polyurethane diol is employed as the diol which corresponds to $R^2$, n is preferred to be an integer of from 1 to 5, particularly 1 to 3. If n is more than 5, appearance of the coated film becomes poor, and if it is less than 1, flexibility of the coated film becomes poor.

The reaction temperature is preferably 60 to 200° C. The blocking agent of the blocked diisocyanate is released as the reaction proceeds. The released blocking agent may allow to present in the reaction mixture, or may be removed from the reaction mixture by using a decanter and the like.

The reaction may proceed smoothly by employing tertiary amine as a catalyst. This is advantageously applicable to the reaction of the blocked isocyanate with the polyepoxide. Examples of the tertiary amine include N,N-dimethylbenzylamine, triethylamine, N,N-dimethylcyclohexylamine, N,N,N',N'-tetramethylethylenediamine, N-methylmorpholine, 1,8-diazabicyclo[5.4.0]undecene, 1,4-diazabicyclo[2.2.2]octane, pyridine, quinoline, and imidazole.

In addition to tertiary amine, a tin compound such as di-n-butyltin dilaurate, tin (II) chloride, tin octenoate, dibutyltin oxide, dioctyltin oxide, 1,3-diacetoxytetrabutyl distannoxane, 1,3-dichlorotetrabutyl distannoxane, and dibutyldibutoxytin, may be employed at once.

The oxazolidone ring-containing epoxy resin of the present invention may be prepared by more simple process. That is, diisocyanate, diol, and a blocking agent are stirred in diepoxide employed as a solvent. In this instance, the diisocyanate, and the diol, and the blocking agent are reacted to form blocked polyisocyanate by first. The above described catalyst is then optionally added, and the reaction mixture is continued to stir and heat. Thereby, the blocked polyurethane diisocyanate is reacted with the diepoxide to obtain the oxazolidone ring-containing epoxy resin of the present invention (the in situ method).

When this preparation process is employed, it is preferred to employ primary diol as the diol. If secondary diol or tertiary diol is employed, the diisocyanate resulted by the reaction further reacts not only with the hydroxyl group of the diol, but also with the hydroxyl group present in the epoxy resin. Thereby, gelation of the reaction mixture may occur, and the reaction may not suitably proceed.

It is usually possible to make the resulting oxazolidone ring-containing epoxy resin water-soluble. Water-solubilization of the oxazolidone ring-containing epoxy resin may be conducted by introducing therein an ionic group. The resulting water-soluble resin may be employed as a binder of an aqueous coating composition. For example, a terminal epoxy group is allowed to ring-open with an active hydrogen compound having an ionic group, and result in, an oxazolidone ring-containing aqueous resin in which an ionic group such as an amino group, and a carboxyl group, is introduced. Further, an aqueous coating composition, for example, an electrodeposition coating composition, may be prepared by using such an oxazolidone ring-containing aqueous resin.

If desired, the resulting oxazolidone ring-containing epoxy resin may be allowed to reacted with polyhydric alcohol, or polycarboxylic acid to extend the chain thereof. Examples of the polyhydric alcohol employed for this purpose include alkylene diol such as ethylene glycol, 1,2-propylene glycol, 1,3-propane diol, 1,4-butane diol, and 1,6-hexane diol; alicyclic diol such as 1,2-cyclohexane diol, and 1,4-cyclohexane diol; aromatic diol such as bisphenol A, bisphenol F, resorcinol, and hydroquinone; polyester diol having a molecular weight of about 300 to 3000 such as that obtained by the esterification reaction of polycarboxylic acid, or anhydride thereof, with polyol, and polycaprolactone diol prepared by the polymerization reaction of caprolactone by using polyol as an initiator; and polyether diol having a molecular weight of 300 to 3000 such as polyoxyethylene glycol, polyoxypropylene glycol, polyoxytetramethylene glycol, the random or block copolymers thereof.

The chain extension reaction may be conducted by using aliphatic dicarboxylic acid such as succinic acid, adipic acid, azelaic acid, dodecane diacid, dimer acid, long-chain aliphatic dicarboxylic acid having 18 to 20 carbon atoms, altered butadiene-acrylonitrile copolymer having a terminal carboxyl group, or aromatic dicarboxylic acid such as phthalic acid, isophthalic acid, and terephthalic acid.

When partial ring-opening of an epoxy group is desired without conducting the chain extension reaction, aliphatic primary alcohol such as n-butanol, ethylene glycol monobutyl ether, octanol, stearyl alcohol; monoalcohol such as xylenol, p-t-butylphenol, p-nonylphenol; aliphatic monocarboxylic acid such as acetic acid, lactic acid, butyric acid, octanoic acid, cyclohexane carboxylic acid, lauric acid, stearic acid, and 1,2-hydroxystearic acid; aromatic monocarboxylic acid such as benzoic acid, and 1-naphthoic acid.

When part of epoxy groups present in the oxazolidone ring-containing epoxy resin are ring-opened by using monoalcohol, or monocarboxylic acid, the chain extension does not occur. Whereas, when the ring-opening reaction is conducted by using a mixture of monoalcohol and diol, or a mixture of monocarboxylic acid and dicarboxylic acid, the ring-opening reaction and the chain extension reaction occur at once. In this instance, the monoalcohol and the monocarboxylic acid work as a termination agent of the chain extension reaction.

The active hydrogen compounds employed for the partial ring-opening reaction (e.g., monoalcohol, diol, monocarboxylic acid, and dicarboxylic acid) are hereinafter referred to as "first active hydrogen compound (b)".

After the partial ring-opening reaction, the epoxy groups left in the oxazolidone ring-containing epoxy resin may be utilized to introduce an ionic groups into the resin. That is, the residual epoxy groups in the oxazolidone ring-containing epoxy resin may be allowed to react with an active hydrogen compound having an ionic group.

When an aqueous resin having a cationic group is desired, an acid salt of primary amine, secondary amine, or tertiary amine, or a mixture of sulfide and acid, are employed as the active hydrogen compound having an ionic group. Examples thereof include butylamine, octylamine, diethylamine, dibutylamine, methylbutylamine, monoethanolamine, diethanolamine, N-methylehanolamine, triethylammonium chloride, N,N-dimethylethanolammonium acetate, a mixture of diethyldisulfide and acetic acid; a secondary amine compound in which a primary amino group is blocked, such as ketimine capped aminoethylethanolamine, and diketimine capped diethylenetriamine. Plural amines may be employed at once.

Primary amine is two equivalent, and it works as a chain extending agent of a polyepoxy compound. Therefore, when primary amine is employed as the active hydrogen compound having an ionic group, the polyepoxy compound is polymerized. Thereby, a polyepoxy compound having high molecular weight is obtained. These amines for reacting with an epoxy group is preferred to be employed in an amount equivalent to the epoxy group present in the oxazolidone ring-containing epoxy resin.

The resulting oxazolidone ring-containing aqueous resin having a cationic group preferably has a number average molecular weight of from 600 to 4000 measured by the GPC method. If the number average molecular weight is less than 600, film forming property of the aqueous resin becomes poor, and when it is over 4000, emulsifying and water-solubilizing the aqueous resin become difficult. The aqueous resin preferably has an amine equivalent weight of from 0.3 to 4.0 meq/g. If the amine equivalent weight is less than 0.3 meq/g, emulsifying and water-solubilizing the aqueous resin become difficult, and when it is over 4.0 meq/g, water resistance of the resulting coated film becomes poor.

When an aqueous resin having an anionic group is desired, polycarboxylic acid such as succinic acid, maleic acid, fumaric acid, phthalic acid, adipic acid, azelaic acid, is allowed to react with an epoxy group present in the oxazolidone ring-containing epoxy resin instead of the amine. Thereby, the half esterification reaction occurs, and an aqueous resin having a terminal carboxylic group is obtained.

The resulting aqueous resin having an anionic group preferably has a number average molecular weight of from 600 to 4000 measured by the GPC method. If the number average molecular weight is less than 600, film forming property of the aqueous resin becomes poor, and when it is over 4000, emulsifying and water-solubilizing the aqueous resin become difficult. The aqueous resin preferably has an acid equivalent weight of from 0.3 to 4.0 meq/g. If the acid equivalent weight is less than 0.3 meq/g, emulsifying and water-solubilizing the aqueous resin become difficult, and when it is over 4.0 meq/g, water resistance of the resulting coated film becomes poor.

The active hydrogen compounds having an ionic group employed for the water-solubilization reaction (e.g., an acid salt of amine, and polycarboxylic acid) are hereinafter referred to as "second active hydrogen compound (c)".

The oxazolidone ring-containing aqueous resin is a reaction product of the components oxazolidone ring-containing epoxy resin (a), the first active hydrogen compound (b), and the second active hydrogen compound (c), as described above. In order to achieve high smoothness, high corrosion resistance of the coated film, and high multi-coating ability, the oxazolidone ring-containing aqueous resin contains preferably 35 to 95% by weight, more preferably 45 to 85% by weight of the component (a) based on solid.

The oxazolidone ring-containing aqueous resin obtained from the above described process may be crosslinked by using a closslinking agent such as a melamine resin, and a polyisocyanate compound. The feature of the oxazolidone ring-containing aqueous resin of the present invention is effectively exerted when it is used as a binder of an aqueous coating composition, particularly an electrodeposition coating composition.

An electrodeposition coating composition which employs the oxazolidone ring-containing aqueous resin of the present invention affords operational convenience in zinc plate coating process, and a coated film excellent in smoothness, corrosion resistance, multi-coating ability, chipping resistance, and heat resistance.

Generally, the oxazolidone ring-containing aqueous resin of the present invention, and a closslinking agent are dispersed into an aqueous medium which contains a neutralizing agent to obtain an aqueous coating composition, e.g., an electrodeposition coating composition. Examples of the closslinking agent typically include a melamine resin such as etherized methylolmelamine, and blocked polyisocyanate.

The blocked polyisocyanate means the polyisocyanate in which a isocyanate group is protected by a blocking agent. The blocking agent is the same as that described in preparing the blocked polyurethane diisocyanate. The above described diisocyanate is also included in the polyisocyanate.

Specific examples of the polyisocyanate include hexamethylene diisocyanurate, and norbornane diisocyanate.

For preparing a cationic electrodeposition coating composition, the oxazolidone ring-containing aqueous resin in which an amino group or a sulfonium group is introduced, have to be employed as an aqueous resin, and an inorganic or an organic acid such as hydrochloric acid, nitric acid, phosphoric acid, formic acid, acetic acid, and lactic acid, have to be employed as a neutralizing agent.

For preparing an anionic electrodeposition coating composition, the oxazolidone ring-containing aqueous resin in which a carboxyl group is introduced, have to be employed as an aqueous resin, and an inorganic or an organic base such as sodium hydroxide, potassium hydroxide, organic amines, have to be employed as a neutralizing agent.

The crosslinking agent have to be included in an amount sufficient for reacting with a functional group present in the resin such as a hydroxyl group to form a satisfactory cured coated film, and the amount is generally from 5 to 50% by weight based on solid. The neutralizing agent have to be included in an amount sufficient for neutralizing at least 20%, preferably 30 to 60% of amino groups or carboxyl groups present in the resin.

A tin compound such as dibutyltin dilaurate, and dibutyltin oxide, or the conventional urethane cleavage catalysts may be included in the coating composition which contains blocked polyisocyanate. The amount of the catalysts is usually 0.1 to 5% by weight of the blocked polyisocyanate.

A coloring pigment such as titanium dioxide, carbon black, colcothar, a rustproofing pigment such as basic lead silicate, aluminium phosphomolybdate, a body pigment such as kaolin, clay, and talc, and a conventional additives for an aqueous coating composition such as an water-miscible organic solvent, a surface active agent, an antioxidant, and a UV absorber, may be included in the coating composition.

The electrodeposition coating method is particularly suitable for coating the aqueous coating composition of the present invention. However, the other coating method such as the dip coating method and the spray coating method may also be employed.

The following examples further illustrate the present invention, however, these are not to be construed as limiting the present invention to their details. The "parts", and the "%" in the examples are the values based on weight unless otherwise indicated. The "epoxy equivalent weight" and the "amine equivalent weight" in the examples are the values based on solid unless otherwise indicated.

EXAMPLES

Example 1

A flask equipped with a stirrer, a cooling device, a nitrogen introducing tube, a thermometer, and a dropping funnel was provided. 60 g of diphenylmethane diisocyanate, 60 g of methyl isobutyl ketone, and 0.01 g of dibutyltin dilaurate were charged in this flask, and then 5 g of methanol was dropwise added with stirring. Temperature of the ingredients was room temperature at first, but heat was generated with proceeding the reaction, and the temperature became 60° C. The reaction was continued for 30 minutes, 75 g of a 6 mol ethylene oxide adduct of bisphenol A (BPE-60 (Trade Name) available from Sanyo Kasei Kogyo K.K.) was then added.

The reaction was mainly conducted and continued at a temperature of from 60 to 65° C., with monitoring an isocyanate group by infrared absorption spectrum until peaks of the isocyanate group disappear to prepare "blocked prepolymer a" (Table 1; Methanol/ MDI/BPE-60=1/3/2 (eq/eq/eq)).

440 g of an epoxy resin having an epoxy equivalent of 188 (DER 331J (Trade Name) available from Dow Chemical Co.) was then added to the ingredients, and heated to 120° C. 1 g of dimethylbenzilamine was added, and the reaction was continued at 130° C. with distilling out the by-produced methanol until the epoxy equivalent weight becomes 263. An absorption which belongs to a carbonyl group of oxazolidone ring was found at 1750 $cm^{-1}$ by using an infrared spectrophotometer.

135 g of bisphenol A and 50 g of 2-ethyl hexanoic acid were added to the flask, and allowed to react at 120° C. until the epoxy equivalent becomes 1118. The flask was then cooled, 40 g of N-methylethanolamine, and 45 g of ketimine capped aminoethylethanolamine (79% by weight of methyl isobutyl ketone solution) were added, and allowed to react for 2 hours at 110° C. Thereafter, the ingredients of the flask was diluted with methyl isobutyl ketone so that nonvolatile content becomes 80% to obtain "oxazolidone ring-containing base resin A".

Example 2

The "blocked prepolymer b" was obtained according to substantially the same manner as described in Example 1, except that the amount ratio as shown in Table 1 was employed, and that a 5 mol propylene oxide adduct of bisphenol A (BP-5P (Trade Name) available from Sanyo Kasei Kogyo K.K.) was employed instead of the 6 mol ethylene oxide adduct of bisphenol A. Thereafter, the "oxazolidone ring-containing epoxy resin B" was prepared by using the "blocked prepolymer b".

Example 3

The "blocked prepolymer c" was obtained according to substantially the same manner as described in Example 1, except that the amount ratio as shown in Table 1 was employed, and that polycaprolactone diol (PLACCEL 208 (Trade Name) available from Daicel Kagaku Kogyo K.K.) was employed instead of the 6 mol ethylene oxide adduct of bisphenol A. Thereafter, the "oxazolidone ring-containing base resin C" was prepared by using the "blocked prepolymer c".

Example 4

A flask equipped with a stirrer, a cooling device, a nitrogen introducing tube, a thermometer, and a dropping funnel was provided. 25 g of hexamethylene diisocyanate, 45 g of methyl isobutyl ketone, and 0.01 g of dibutyltin dilaurate were charged in the flask, and then 155 g of a 6 mol ethylene oxide adduct of bisphenol A (BPE-60 (Trade Name) available from Sanyo Kasei Kogyo K.K.) was then added.

The reaction was conducted and continued at a temperature of from 70 to 80° C., with monitoring an isocyanate group by infrared absorption spectrum until peaks of the isocyanate group disappear to prepare polyurethane diol. 5 g of methanol was added to the flask, and 60 g of diphenylmethane diisocyanate was dropwise added.

The reaction was conducted and continued at a temperature of from 50 to 60° C., with monitoring an isocyanate group by infrared absorption spectrum until peaks of the isocyanate group disappear to prepare "blocked prepolymer d". The "oxazolidone ring-containing base resin D" was prepared by using the "blocked prepolymer d" according to substantially the same manner as described in Example 1 except that the amount ratio as shown in Table 1 was employed.

Example 5

A flask equipped with a stirrer, a cooling device, a nitrogen introducing tube, a thermometer, and a dropping funnel was provided. 440 g of an epoxy resin having an epoxy equivalent weight of 188 synthesized from bisphenol A and epichlorohydrin (DER 331J (Trade Name) available from Dow Chemical Co.), 30 g of methyl isobutyl ketone, 5 g of methanol, 75 g of a 6 mol ethylene oxide adduct of bisphenol A (BPE-60 (Trade Name) available from Sanyo Kasei Kogyo K.K.), and 0.01 g of dibutyltin dilaurate were charged in the flask, and 60 g of diphenylmethane diisocyanate was dropwise added with stirring. Temperature of the ingredients was room temperature at first, but heat was generated with proceeding the reaction, and the temperature became to 60° C. The reaction was continued for 30 minutes thereafter.

The reaction was conducted and continued at a temperature of from 60 to 65° C., with monitoring an isocyanate group by infrared absorption spectrum until peaks of the isocyanate group disappear (Table 1). 1 g of dimethylbenzilamine was then added, and the reaction was continued at 130° C. with distilling out by-produced methanol until the epoxy equivalent weight becomes 263. An absorption which belongs to a carbonyl group of oxazolidone ring was found at 1750 $cm^{-1}$ by using an infrared spectrophotometer.

135 g of bisphenol A and 50 g of 2-ethyl hexanoic acid were added to the flask, and allowed to react at 120° C. until the epoxy equivalent becomes 1118. The flask was then cooled, 40 g of N-methylethanolamine, and 45 g of ketimine capped aminoethylethanolamine (79% by weight of methyl isobutyl ketone solution) were added, and allowed to react for 2 hours at 110° C. Thereafter, the ingredients of the flask was diluted with methyl isobutyl ketone so that nonvolatile content becomes 80% to obtain oxazolidone ring-containing base resin E.

Example 6

The "oxazolidone ring-containing base resin F" was obtained according to substantially the same manner as described in Example 5, except that the amount ratio as shown in Table 1 was employed, and that a 5 mol propylene oxide adduct of bisphenol A (BP-5P (Trade Name) available from Sanyo Kasei Kogyo K.K.) was employed instead of the 6 mol ethylene oxide adduct of bisphenol A.

TABLE 1

Reaction amount ratio by weight (by equivalent) of ingredients in preparing oxazolidone ring-containing base resin

| | Step by Step Method | | | In Situ Method | | |
|---|---|---|---|---|---|---|
| | Ex. 1 | Ex. 2 | Ex. 3 | Ex. 4 | Ex. 5 | Ex. 6 |
| Methanol | 5(1)[a] | 5(1) | 5(1) | 5(1) | 5(1) | 5(1) |
| MDI | 60(3) | 60(3) | 80(4) | 60(3) | 60(3) | 60(3) |

TABLE 1-continued

Reaction amount ratio by weight (by equivalent) of ingredients in preparing oxazolidone ring-containing base resin

| | Step by Step Method | | | In Situ Method | | |
|---|---|---|---|---|---|---|
| | Ex. 1 | Ex. 2 | Ex. 3 | Ex. 4 | Ex. 5 | Ex. 6 |
| HDI | — | — | — | 25(2) | — | — |
| BPE60[b] | 75(2) | — | — | 155(4) | 75(2) | — |
| BP5P[c] | — | 85(2) | — | — | — | 85(2) |
| PCL208[d] | — | — | 185(3) | — | — | — |
| DER331J[e] | 440 | 440 | 440 | 440 | 440 | 440 |
| 2HEA[f] | 50 | 50 | 50 | 50 | 50 | 50 |
| BPA[g] | 135 | 130 | 120 | 125 | 135 | 130 |
| N-MetA[h] | 40 | 40 | 45 | 45 | 40 | 40 |
| Ketimine[i] | 45 | 45 | 50 | 50 | 45 | 45 |

[a]Value in parenthesis shows the reaction amount ratio by equivalent.
[b]6 mol ethylene oxide adduct of bisphenol A (BPE-60 (Trade Name) available from Sanyo Kasei Kogyo K.K.)
[c]5 mol propylene oxide adduct of bisphenol A (BP-5P (Trade Name) available from Sanyo Kasei Kogyo K.K.)
[d]polycaprolactone diol (PLACCEL 208 (Trade Name) available from Daicel Kagaku Kogyo K.K.)
[e]Epoxy resin having an epoxy equivalent of 188 (DER 331J (Trade Name) available from Dow Chemical Co.)
[f]2-ethyl hexanoic acid
[g]Bisphenol A
[h]N-methylethanolamine
[i]Ketimine capped aminoethylethanolamine

Comparative Example 1

765 g of an epoxy resin having an epoxy equivalent weight of 950 prepared from bisphenol A and epichlorohydrin, 15 g of 2-ethyl hexanoic acid, and 85 g of methyl isobutyl ketone were weighed in the flask substantially the same as that employed in the Examples, and the ingredients were heated and homogeneously mixed. 0.3 g of dimethylbenzylamine was added, and allowed to react at 130° C. until the epoxy equivalent weight becomes 1176. The flask was then cooled, 45 g of N-methylethanolamine, and 45 g of ketimine capped aminoethylethanolamine (79% by weight of methyl isobutyl ketone solution) were added, and allowed to react for 2 hours at 110° C. Thereafter, the ingredients of the flask were diluted with methyl isobutyl ketone so that nonvolatile content becomes 80% to obtain "comparative resin a".

Comparative Example 2

725 g of an epoxy resin having an epoxy equivalent weight of 650 prepared from bisphenol A and epichlorohydrin, 25 g of 2-ethyl hexanoic acid, and 85 g of polycaprolactone diol employed in Example 2, and 45 g of methyl isobutyl ketone were weighed in the flask substantially the same as that employed in the Examples, and the ingredients were heated and homogeneously mixed. 0.3 g of dimethylbenzylamine was added, allowed to react at 150° C. until the epoxy equivalent weight becomes 1170. The flask was then cooled, 45 g of N-methylethanolamine, and 45 g of ketimine capped aminoethylethanolamine (79% by weight of methyl isobutyl ketone solution) were added, and reacted for 2 hours at 110° C. Thereafter, the ingredients of the flask were diluted with methyl isobutyl ketone so that nonvolatile content becomes 80% to obtain "comparative resin b".

Comparative Example 3

70 g of 2,4-/2,6-tolylene diisocyanate (a weight ratio of 8/2), and 25 g of methanol were reacted according to substantially the same manner as described in Example 1. 535 g of an epoxy resin having an epoxy equivalent weight of 188 was added to the ingredients and allowed to react, then 75 g of bisphenol A, and 100 g of 2-ethyl hexanoic acid were added and allowed to react.

45 g of N-methylethanolamine, and 45 g of ketimine capped aminoethylethanolamine (79% by weight of methyl isobutyl ketone solution) were added, and allowed to react. Thereafter, the ingredients of the flask was diluted with methyl isobutyl ketone so that nonvolatile content becomes 80% to obtain "comparative resin c".

Preparation Example of Curing Agent

A flask equipped with a stirrer, a cooling device, a nitrogen introducing tube, a thermometer, and a dropping funnel was provided. 200 g of a hexamethylene diisocyanate trimer (COLONATE (Trade Name) available from Nippon Polyurethane K.K.), and 11 g of ε-caprolactam were charged in the flask. The ingredients of the flask was heated to 80° C., and homogeneously dissolved. 30 g of methyl isobutyl ketone and 0.05 g of dibutyltin dilaurate were added. 80 g of methyl ethyl ketoxime was dropwise added from the dropping funnel to the ingredients with stirring, and nitrogen bubbling, so that sudden heat generation did not occur. The reaction was continued until peaks of the isocyanate group disappear to obtain a blocked isocyanate crosslinking agent.

Preparation Example of Pigment Dispersed Paste

A flask equipped with a stirrer, a cooling device, a nitrogen introducing tube, a thermometer, and a dropping funnel was provided. 220 g of isophorone diisocyanate was charged in the flask, it was diluted with 40 g of methyl isobutyl ketone, and 0.2 g of dibutyltin dilaurate was added to the flask.

The reaction temperature was raised to 50° C., 130 g of 2-ethyl hexanol was dropwise added from the dropping funnel to the ingredients over 2 hours with stirring, and nitrogen bubbling. The reaction temperature was kept 5° C. by cooling suitably. As a result, 2-ethyl hexanol half-blocked isophorone diisocyanate was obtained (a solid content of 90%).

Another flask equipped with a stirrer, a cooling device, a nitrogen introducing tube, a thermometer, and a dropping funnel was provided. 375 g of EPON 828 (an epoxy resin available from Shell Kagaku K.K.), and 115 g of bisphenol A were charged in the flask, the ingredients were heated to 130° C. under nitrogen atmosphere, 0.75 g of dimethylbenzylamine was added, and allowed to react with heat generating at 170° C. for 1 hour to obtain a bisphenol A type epoxy resin having an epoxy equivalent weight of 490.

The flask was cooled to 140° C., and 200 g of 2-ethyl hexanol half-blocked isophorone diisocyanate was added. The reaction temperature was kept 140° C. for 1 hour to react, 160 g of ethylene glycol monobutyl ether was added, and the flask was cooled to 100° C. 365 g of thiodiethanol, 135 g of dimethylol propionic acid, and 145 g of deionized water were added, allowed to react at 70 to 75° C. until the acid value becomes 0.241, then diluted with 355 g of ethylene glycol monobutyl ether to obtain a pigment dispersing resin having a tertiary sulfoniumed rate of 82% (a solid content of 30%).

Carbon black, kaolin, titanium dioxide, and phosphorous molybdate were dispersed into the pigment dispersing resin by using a sand mill to obtain a pigment dispersed paste.

| Composition | |
|---|---|
| Ingredients | Amount (g) |
| Pigment dispersing resin | 100.0 (30 by solid) |
| Carbon black | 0.9 |
| Kaolin | 50.0 |
| Titanium dioxide | 34.1 |
| Phosphorous molybdate | 15.0 |
| Deionized water | 16.7 |

Preparation of Electrodeposition Coating Composition 280 g (solid) of the cationic electrodeposition resin (A to F, a to c) prepared in Examples 1 to 6, and Comparative Examples 1 to 3, and 120 g (solid) of the crosslinking agent were mixed, ethylene glycol mono-2-ethylhexyl ether was added in an amount of 3% (12 g) based on solid, and the temperature was raised to 80° C. The ingredients were pored into an acidic aqueous solution made by mixing 266.6 g of deionized water and 6.24 g of acetic acid with stirring by using a dispersing device. 455 g of deionized water was slowly added thereafter to obtain an emulsion solution having a solid content of 36%. The emulsion solution was concentrated under reduced pressure to remove a volatile solvent, and deionized water was added, and solid content was controlled to 36%. Particle size of the emulsion solution was measured by spectrophotometer, and shown in Table 2.

270 g of the pigment dispersed paste prepared in the Preparation Example (a solid content of 60%), 1430 g of deionized water, and dibutyltin oxide in an amount of 1.0% by weight based on solid were added to the resulting emulsion to prepare an electrodeposition coating composition having a nonvolatile content of 20%.

A steel plate treated with zinc phosphate was dipped into a bath containing the electrodeposition coating composition, electrodeposition coated so that the coating have a dry thickness of 20 μm, and cured at 160° C. for 10 min. The resulting coated film was evaluated. The results were shown in Tables 2 and 3.

TABLE 2

| | Examples | | | | | |
|---|---|---|---|---|---|---|
| | 1 | 2 | 3 | 4 | 5 | 6 |
| Emulsion size (nm)[1] | 130 | 120 | 150 | 160 | 130 | 120 |
| Appearance (Ra)[2] | 0.20 | 0.22 | 0.18 | 0.20 | 0.20 | 0.22 |
| Impact resistance[3] | ○ | ○ | ○ | ○ | ○ | ○ |
| Brine resistance[4] (Removal/Blister) | ○/○ | ○/○ | ○/○ | ○/○ | ○/○ | ○/○ |
| Throwing power (Four box method)[5] | 11 | 10 | 12 | 10 | 11 | 10 |
| Convenience in Zn[6] | 260 | 280 | 280 | 280 | 260 | 280 |

TABLE 3

| | Comp. Ex. | | |
|---|---|---|---|
| | 1 | 2 | 3 |
| Emulsion size[1] | 140 | 200 | 120 |
| Appearance (Ra)[2] | 0.22 | 0.21 | 0.20 |
| Impact resistance[3] | Δ | ○ | X |
| Brine resistance[4] (Removal/Blister) | Δ/Δ | X/X | ○/○ |
| Throwing power (Four box method)[5] | 5–6 | 7 | 11 |
| Convenience in Zn[6] | 220 | 220 | 200 |

Evaluation Method

1) Particle Size of the Emulsion

Particle size in average diameter of the emulsion was measured by using spectrophotometer (U-1100 (Trade Name) available from Hitachi Seisakusyo K.K.). Unit for measurement is "nm".

2) Appearance (Ra)

Appearance of the coated film was measured by using a surface roughness measuring device (E-30A (Trade Name) available from Tokyo Seimitsu K.K.). Unit for measurement is "μm".

3) Impact Resistance under Low Temperature

A plummet having a weight of 500 g and an impact center diameter of ½ inch was dropped from 50 cm above on a surface of the coated plate cooled to a temperature of −5° C. Thereafter, a surface of the coated film was visually inspected according to the following standard.

○: No change

Δ: Fine cracks are found

X: Large cleavages are found

4) Brine Resistance

The coated film of the coated plate was cut by a knife to make a gap got through a surface of the steel plate. The coated plate having the gap was dipped in a bath containing 5% of brine at 55° C. for 120 hours. Thereafter, a surface of the coated film was visually inspected according to the following standard.

Removal: Maximum width (mm) from the gap of the area on which the coated film was removed.

○: Less than 3 mm

Δ: 3 to 6 mm

X: More than 6 mm

Blister: Number of blister present in a surface area of 15 cm×7 cm.

○: Very few (0 to 2)

Δ: Rather few (3 to 6)

X: Many (more than 7)

5) Throwing Power (Four Box Method)

Throwing power of the coated film was measured by using a four pieces box multi-coating ability measuring device (Tecnocosmos, vol 3, 44, 1993, available from Nippon Paint K.K.). Four steel plates treated with zinc phosphate having opening were placed side by side at an interval of 200 nm in an electrodeposition bath. Electrodeposition coating was conducted at the coating voltage so that coating thickness of the steel plate nearest to an electrode becomes 25 μm. Unit for measurement was "μm".

6) Operational Convenience in Zinc Plate Coating

A zinc plate was electrodeposition coated with increasing the coating voltage. Maximum voltage at which an appearance error (pinhole) did not occur was measured. Unit for measurement was "V".

What is claimed is:

1. An oxazolidone ring-containing aqueous resin prepared by a process comprising the steps of:

reacting an oxazolidone ring-containing epoxy resin (a) having a structure of the formula:

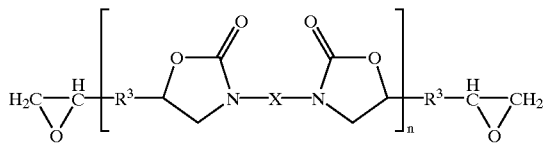

wherein $R^3$ represents a residue excluding epoxy groups of diepoxide, X represents a residue excluding isocyanate groups of polyurethane diisocyanate, and n represents an integer of 1 to 5; and wherein X has a structure of the formula:

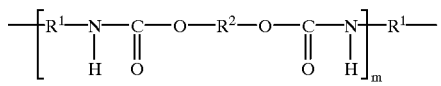

wherein $R^1$ represents a residue excluding isocyanate groups of diisocyanate, $R^2$ represents a residue excluding hydroxyl groups of diol, and m represents an integer of 2 to 10, with at least one first active hydrogen compound (b) selected from the group consisting of monoalcohol, diol, monocarboxylic acid, and dicarboxylic acid to partially open the ring of the epoxy groups present in the oxazolidone ring-containing epoxy resin (a); and allowing the resulting product to react with a second active hydrogen compound having an ionic group (c) to open the ring of the rest of the epoxy groups.

2. The oxazolidone ring-containing aqueous resin according to claim 1, wherein the first active hydrogen compound (b) is polyether polyol, polyester polyol, or bisphenols and their derivatives.

3. The oxazolidone ring-containing aqueous resin according to claim 1, wherein the first active hydrogen compound (b) is aliphatic primary alcohol, or phenols and their derivatives.

4. The oxazolidone ring-containing aqueous resin according to claim 1, wherein the first active hydrogen compound (b) is aliphatic or aromatic dicarboxylic acid.

5. The oxazolidone ring-containing aqueous resin according to claim 1, wherein the first active hydrogen compound (b) is aliphatic or aromatic monocarboxylic acid.

6. The oxazolidone ring-containing aqueous resin according to claim 1, wherein the second active hydrogen compound (c) is an acid salt of primary amine, secondary amine, or tertiary amine.

7. The oxazolidone ring-containing aqueous resin according to claim 1, wherein the second active hydrogen compound (c) is a mixture of sulfide and acid.

8. The oxazolidone ring-containing aqueous resin according to claim 1, wherein the second active hydrogen compound (c) is aliphatic, or aromatic polycarboxylic acid.

9. The oxazolidone ring-containing aqueous resin according to claim 1, wherein the oxazolidone ring-containing epoxy resin (a) is contained in an amount of from 35 to 95% by weight based on solid.

* * * * *